May 13, 1941.  C. S. ASH  2,242,048

DUAL WHEELED VEHICLE

Filed March 22, 1939  4 Sheets-Sheet 3

INVENTOR
Charles S. Ash
BY
Morgan, Finnegan & Durham
ATTORNEYS

May 13, 1941.  C. S. ASH  2,242,048
DUAL WHEELED VEHICLE
Filed March 22, 1939  4 Sheets-Sheet 4

INVENTOR
Charles S. Ash.
BY
Morgan Finnegan & Durham
ATTORNEYS

Patented May 13, 1941

2,242,048

UNITED STATES PATENT OFFICE 2,242,048

DUAL WHEELED VEHICLE

Charles S. Ash, Milford, Mich.

Application March 22, 1939, Serial No. 263,347

19 Claims. (Cl. 188—18)

The present invention relates to dual wheeled vehicles and more particularly to a novel and improved dirigible dual wheeled assembly.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate two modifications of the invention, and together with the description, serve to explain the principles of the invention.

Figure 1:
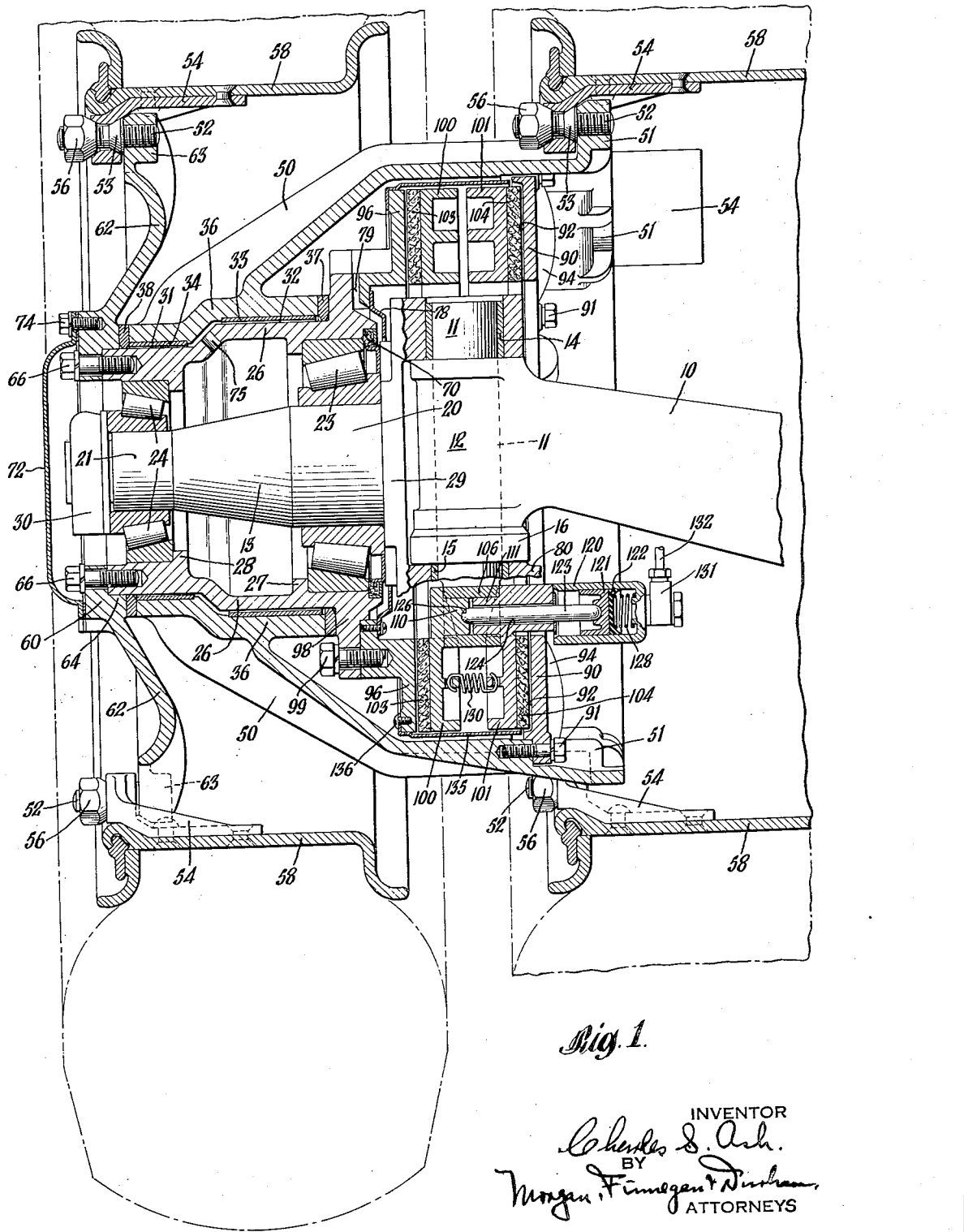
Fig. 1 is a sectional view taken on the line 1—1 of Fig. 2 and showing an illustrative embodiment of the present invention as applied to dirigible dual wheels.

The present invention has for its object the provision of a novel and improved dual wheel assembly particularly adapted for use on the front end of relatively heavy vehicles such as motor busses, trucks or tractors. The invention also provides a novel and improved means for braking independently rotatable, dirigible dual wheels. A further object of the invention is the provision of an improved braking structure for independently rotatable dual wheels which insures the application of an equal braking force to both of the wheels so that when the structure is employed on the dirigible wheels of a vehicle, there is no tendency for the vehicle to swerve to one side or the other when the brakes are applied. Still another object of the invention is the provision of a statically and dynamically balanced brake and wheel assembly which is particularly useful in connection with independently rotatable dirigible dual wheels. The invention also provides a braked, dirigible dual wheel assembly having independently rotatable wheels in which the brake members attached to the wheels surround or enclose and protect the other braking members and brake actuating means, and these members and means are preferably located in front of and at the rear of, and substantially in the plane of, the king pin by which the dual wheels are dirigibly mounted. Furthermore, the invention provides an exceedingly compact braked wheel mechanism in which the parts are disposed so as to require a minimum amount of space and at the same time the parts are so arranged as to prevent excessive transfer of heat from the brakes to the tires.

In certain respects, the present invention is an improvement upon the structure of my prior Patent No. 1,979,598 granted November 6, 1934, but in other respects the invention is of more general application.

In accordance with the typical and illustrative embodiments of the invention herein described, there are provided at each side of the front of the bus, truck or tractor, two wheels mounted side by side for independent rotation about a common axis, and preferably one of the wheels is telescopically journalled on the hub of the other wheel to reduce overall dimensions while maintaining maximum spacing of the wheel bearings. These wheels are freely rotatably mounted on a spindle which is pivotally mounted to turn about a substantially vertical king pin held at the end of the beam of the front axle. The king pin is so positioned with reference to the two wheels that the axis of the king pin passes between the wheels at the point where the axis intersects the road. Suitable means are provided for connecting the spindle with the steering mechanism so that it may be turned to the proper angle for steering the vehicle. Braking means are provided for each of the wheels, and these braking means are preferably statically and dynamically balanced so as to eliminate any tendency to shimmy. These braking means cooperate with stationary braking members and with the actuating means for the brakes, and substantially surround and enclose the braking members and actuating means. Preferably, the braking structure is so constructed that the axis of the king pin passes through it, and so that the brake actuating means are located in front of and to the rear of the king pin. As embodied, separate brake drums are fixedly connected with individual independently rotatable wheels, and the braking members which contact and frictionally engage these drums are positioned between the drums and are adapted to be pressed against the drum with equal pressure.

It will be understood that the foregoing general description and the following detailed description as well, are exemplary and explanatory of the invention but are not restrictive thereof.

Figure 2:
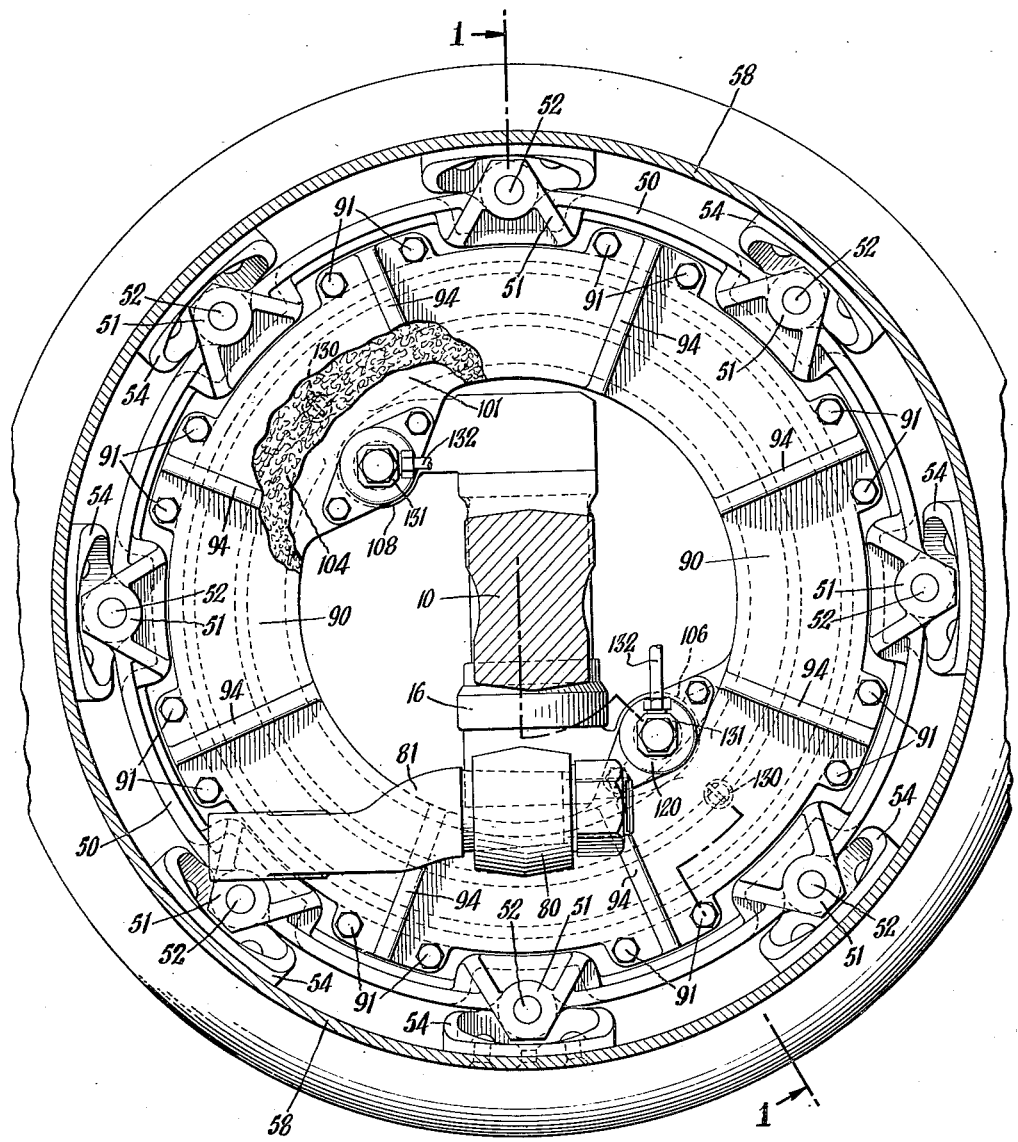
Fig. 2 is a side elevation, with certain parts shown in section and looking from the inside of a dual wheel assembly.

Referring now in detail to Figures 1 and 2 of the accompanying drawings showing a typical and illustrative embodiment of the present invention, there is provided an axle beam 10, at each end of which is mounted a substantially vertical king pin 11 extending above and below the axle beam end 12. King pin 11 pivotally supports the solid stub axle or spindle 13 which extends horizontally outwardly from the end of the axle beam 10, and has its upper and lower forked ends apertured to receive the bushings 14 and 15 by which the spindle is pivotally mounted on the king pin. An anti-friction thrust bearing 16 is inserted between the lower end of the spindle and the lower face of axle beam end 12 to facilitate pivotal turning of the spindle 13. Spindle 13 is provided with bearing seats 20 and 21 on which are mounted tapered roller bearings 23 and 24 which are received within and rotatably support the outer wheel hub 26, these bearings being held in place by means of the hub shoulders 27, 28, the spindle shoulders 29, and the bearing retaining locked nut 30. The outer surface of the hub 26 is finished to provide two bearing surfaces 31 and 32 which cooperate with the bushings 33 and 34 to journal the inner hub 36 on the outside of the outer hub 26. Thrust washers 37 and 38 are provided to take up the end of the thrust between the two wheels.

The inner wheel comprises a plurality of relatively heavy spoke-like ribbed members 50 which may be interconnected by a web to form a ribbed disc-like wheel and are formed integral with the hub 36 and extending outwardly and inwardly therefrom, terminating in radially outwardly extending apertured members 51 which receive the threaded studs 52 by which the tire rims are secured to the wheel. Studs 52 are provided with a beveled shoulder 53 over which and the outer end of the stud the rim attaching lug 54 is adapted to be passed and held in place by means of the frustro-conical nut 56. Lugs 54 are securely riveted to the inner face of the rim 58, and one such lug is provided for each of the spokes 50.

The outer wheel comprises an annular member 60 provided with ribbed spoke-like members 62 extending outwardly therefrom and connected together by a web to provide a disc-like wheel. The spoke-like members are apertured at their ends 63 to receive the rim mounting studs 52 by means of which the rim 58 is secured to the outer wheel. Near its central part and on the interior member 60 it is provided with a shouldered portion 64 which serves both as a bearing surface to seat against the thrust washer 38, and also serves as a mounting guide to fit over the periphery of the outer end of hub member 26. The annular member 60 and its radiating spokes are secured to the hub member 26 by means of cap screw 66 which pass through apertures in the member 60 and are threaded into the hub member 26.

Means are provided for retaining lubricant within the wheel structure and as embodied comprise lubricant retaining ring 70 positioned between the hub member 26 and the inner race of bearing 23, while at the outer end of the wheel assembly there is provided a hub cap 72 which is secured to the annular portion 60 by means of cap screws 74. An aperture 75 is provided from the interior of hub 26 to a point between the bushings 33 and 34 serving to supply these bearings and the thrust washers 37 and 38 with lubricant.

The foregoing structure provides a pair of dual dirigible wheels at each end of the axle beam 10 and these wheels are independently rotatable and may be turned about the pivot 11 for steering movement. The rims 58 extend inwardly from their supporting and attaching lugs, and the spokes of the wheels are so proportioned as to provide the proper spacing between the inner and outer pneumatic tires which are mounted in a conventional manner on the rims. At the bottom of spindle 13 is provided an integral arm 80 which extends inwardly of the axle beyond the king pin 11 and is apertured to provide for the attachment of the usual steering knuckle arm 81.

Brake means are provided for simultaneously applying a smooth, equal braking effort to both wheels of the dual assembly and for this purpose a pair of annular braking surfaces are rigidly secured to each of the wheels. As embodied, an annular member 90 is secured to the inner portion of the spoke-like members 50 by means of the cap screws 91 and provides a flat annular braking surface 92 on its side towards the outer wheel, while the other or inner side is provided with strengthening ribs 94 which also serve to increase air circulation over the brake surface. A similar flat annular braking surface is provided for the outer wheel by means of the brake member 96 which is secured to the inner and enlarged end 98 of hub 26 by means of cap screws 99. The braking surfaces for the inner and outer wheels thus face each other and are substantially of equal braking area and are at approximately the same distance from the axis of the king pin 11. Braking effort is applied to the annular members 90 and 96 by means of the friction created between their braking surfaces and the stationary laterally movable braking members 100 and 101. Members 100 and 101 are faced with friction material 103 and 104 on their faces adjacent the braking annuli 90 and 96, while these members 100 and 101 are made substantially E-shaped in section to give added strength against deflection.

Means are provided for mounting the brake members 100, 101 so that they always remain parallel to the plane of the wheels as spindle 13 is turned for steering, and as embodied the upper and lower yoke end portions of the spindle 13 are formed with eyes 106 and 108 which are adapted to receive the circular guide portions 110 and 111 of the brake members 100, 101 respectively. These cylindrical guide portions 110 and 111 extend from their respective braking members towards and into approximate contact with each other, meeting at the central portion of the eyes 106 and 108, and while these eyes 106 allow axial movement of the brake members 100 and 101 toward and from each other, they always serve to keep the brake members parallel to each other and to the brake members 90 and 96 and at the same time prevent rotation of the brake members 100 and 101 as the brakes are applied.

Means are provided for reactively expanding the brake members 100 and 101 away from each other and for this purpose hydraulic cylinders 120 are mounted on the brake member 101 substantially in line with the eyes 106 and 108, one in front and one to the rear of the king pin. Within each of the cylinders is a piston 121 and its sealing member 122, and a pin 123 which is freely axially movable through an aperture 124 in the brake member 101 so that the outer end of pin 124 may contact with a seat 126 formed in the cylindrical portion 110. A spring 128 serves to maintain the piston 121 and the pin 123 in contact with each other, while springs 130, spaced circumferentially around the brake and in tension between apertures in the central ribs and brake members 100 and 101 overpower the springs 128 and keep the brake members 100 and 101 normally out of frictional engagement with the braking annuli 90 and 96.

Motive power is supplied to the brake cylinders 120 by means of fluid under pressure through pipe 132 and couplings 131, and as pressure is exerted by this fluid, the pistons 121 are moved to the left (Fig. 1) moving pins 123 to the left and forcing friction material 103 into contact with the inner or braking surface of annulus 96. At the same time an exactly equal and opposite pressure is exerted on the braking member 101 to move its friction material 104 into contact with the braking annulus 90, and this braking force thereby creates an equal braking effort on each of the wheels.

A cover plate 135 is mounted on the periphery of the annulus 96 by means of screws 136 and serves to exclude dirt and foreign matter from the brake assembly, while the inner and outer sides of the brake assembly are substantially surrounded and enclosed by the annuli 90 and 96.

A deflector plate 78 extends towards shoulder 29 and contacts with the inner face of member 96 serving to prevent lubricant coming in contact with the brake parts, and any excess lubricant leaking past the ring 70 is drained off by centrifugal force through aperture 79.

Figure 3:
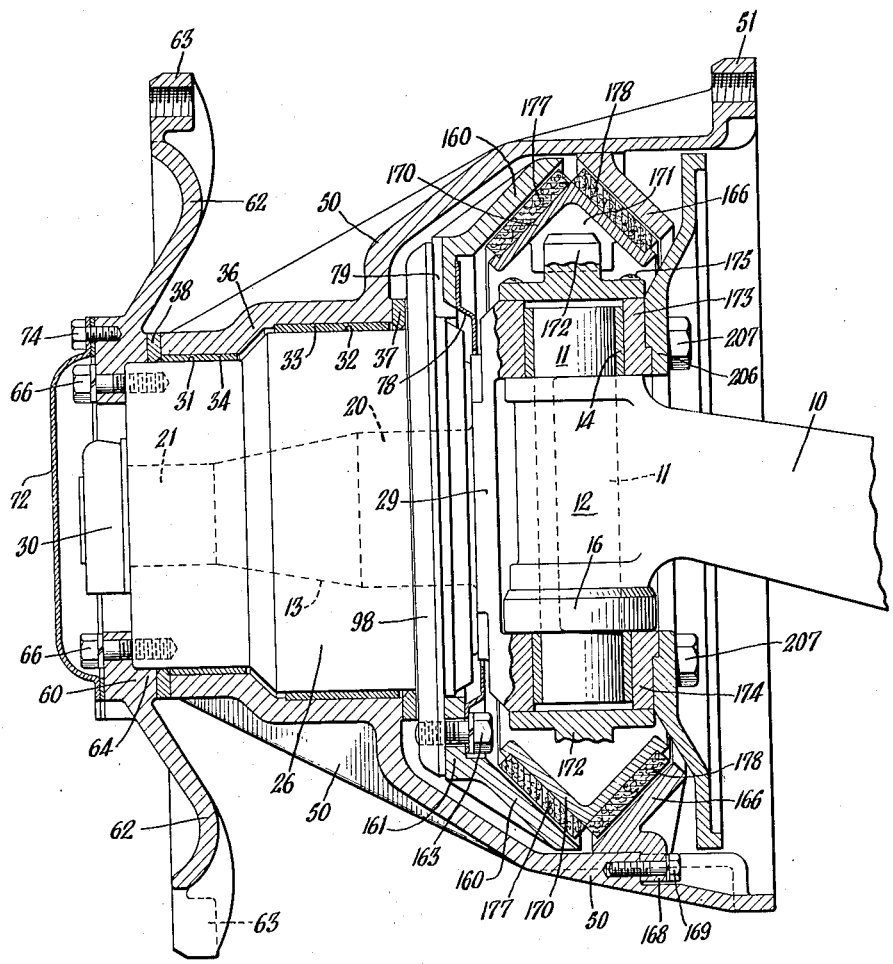
Fig. 3 is a vertical sectional view of a modified embodiment of the present invention with the wheels or rims removed from the hub structure.
Figure 4:
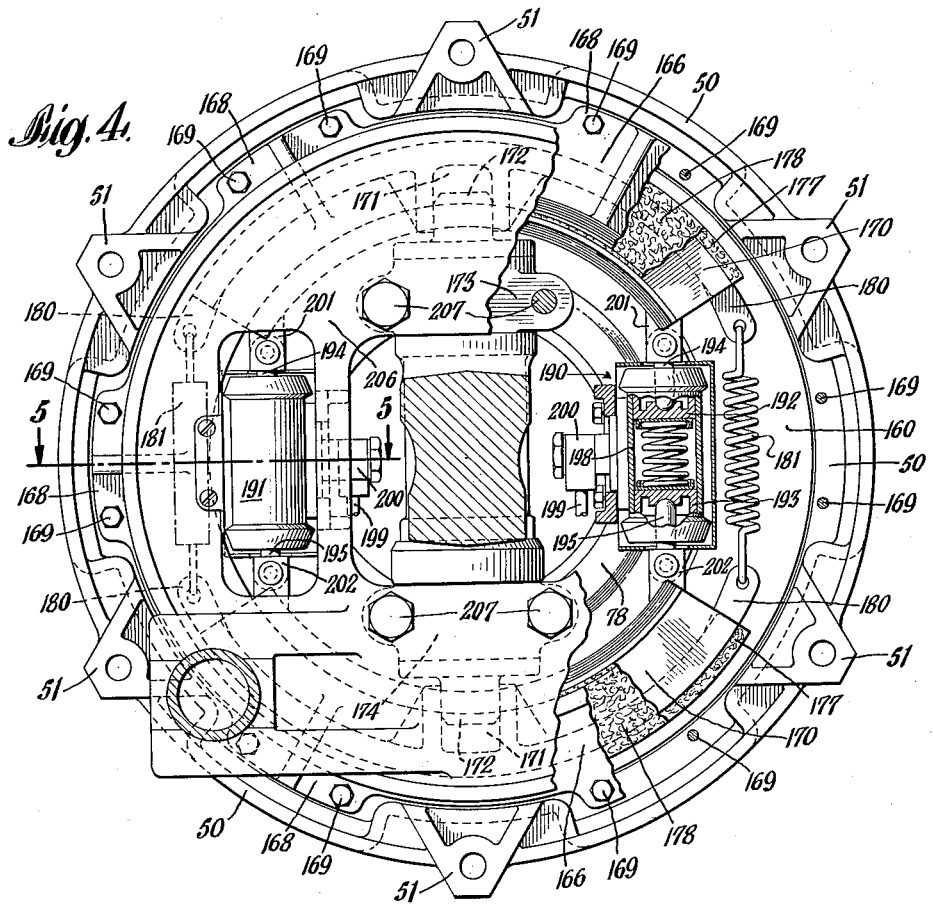
Fig. 4 is a side elevation, with certain parts shown in section and others broken away, of the structure shown in Fig. 3.
Figure 5:
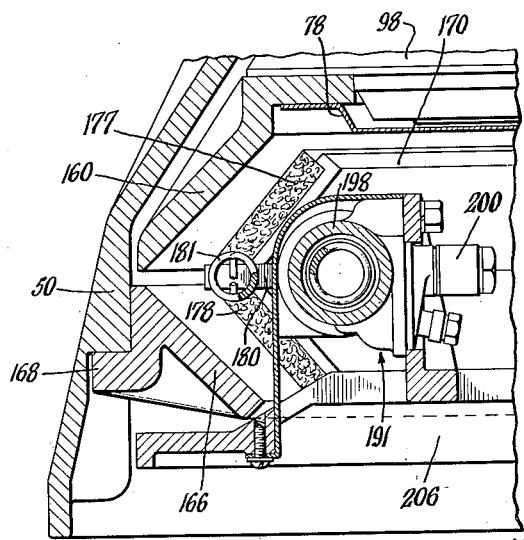
Fig. 5 is a fragmentary horizontal section taken on the line 5—5 of Fig. 4.

Figures 3 to 5 of the drawings show a modified embodiment of the invention in which a somewhat different form of brake is shown in connection with a substantially similar set of independently rotatable dirigible dual wheels. As embodied, the brake members attached to and carried by the inner and outer wheels are formed with substantially similar frustro-conical inner faces. The member for the outer wheel comprises a frustrum 160 having an integral annular portion 161 extending inwardly therefrom which is apertured to receive cap screws 163 by which the frustrum 160 is secured to the enlarged rim 98 of the outer wheel hub.

The braking member for the inner wheel comprises a similar frustrum 166 which is provided with an outwardly extending apertured lip 168 through which are passed the set screws 169 by which it is attached to the inner periphery of the inner wheel spoke members 50. Members 160 and 166 are preferably positioned symmetrically with respect to the king pin 11, and the inner section of the inner conical faces of these members lies in a plane which is parallel to the plane of the two wheels and is also intercepted by the axis of the king pin 11.

Means are provided for exerting a braking effort against the frustro-conical drums 160 and 166 and as embodied upper and lower brake shoe members 170 are provided having a generally arcuate periphery which is V-shaped in transverse section. Intermediate their ends each is provided with a cylindrical socket 171 to fit over and be vertically mo...ble up and down on the cylindrical stud 172 alined with the king pin 11 and capping the top and bottom apertures of the spindle yoke ends 173 and 174, being secured thereto by means of screws 175. The outer faces of the members 170 are provided with bands of friction material 177, 178, and these friction strips extend for the full length of the almost semi-cylindrical length of the brake shoes 170. Extending beyond the ends of the brake shoes 170 and secured to their inner face are the spring anchors 180 between which are stretched the brake retracting springs 181.

Brake energizing means are provided and illustratively comprise the hydraulic motors 190, 191 of conventional construction having two pistons 192 and 193 which are connected to the oppositely extending and alined piston rods 194 and 195. These pistons are axially movable within the hydraulic pressure cylinders 198 to the center of which is supplied brake fluid under pressure by means of pipes 199 and fittings 200. At the outer ends of the piston rods 194 and 195 are pivotally connected the links 201 and 202 which transmit the braking effort from the pistons to the brake shoes 170. Brake motors 190 and 191 are securely mounted on the inner face of an anchor plate 206 which is secured to the upper and lower spindle yoke ends 173 and 174 by means of the cap screws 207, and plate 206 is provided with a rectangular aperture near its center which permits the spindle 13 and the wheel assembly to be turned for steering about the king pin 11.

As fluid under pressure is supplied to the motors 190 and 191, the upper and lower brake shoes 170 are forced away from each other and into contact with the brake drums 160, 166, and due to the conical shape of these brake drums and the brake shoes, the brake pressure and braking effort is equally applied to the brake drums for the inner and outer wheels. As this pressure is always equal, and as it is always applied symmetrically with respect to the king pin, and as the wheels are substantially symmetrically spaced with respect to the king pin, there is no tendency for the spindle to swerve to one side or the other, and the application of the brakes does not disturb the proper steering of the vehicle.

Preferably, and as shown, the center line of the wheels and of the spindles 13 is slightly to the rear of the king pin axis, so as to give a slight forward caster to the wheels, but the king pin is vertical both with respect to the axle plane and with respect to the plane normal to the axle, as distinguished from the conventional type of dirigible wheel in which the king pin is inclined slightly to the vertical for both caster and camber.

The invention in its broader aspects is not limited to the specific mechanisms shown and described but departures may be made therefrom within the scope of the accompanying claims without departing from the principles of the invention and without sacrificing its chief advantages.

What I claim is:

1. In a dual wheel assembly, a pair of side by side dual wheels mounted for independent rotation, a pair of brake members one connected to each wheel, brake shoe means frictionally engageable with the members and floating brake actuating means mounted on one brake member and operating on the other brake member connected with the brake shoe means, said brake actuating means serving to move the shoe means away from each other and into contact with the brake members.

2. In a dual wheel assembly, a pair of side by side dual wheels mounted for independent rotation, a pair of flat, annular brake members, one connected to each wheel and independently rotatable, a pair of brake shoes between the brake members and means mounted on the brake shoes and interconnecting them for moving the brake shoes into braking contact with their respective brake members.

3. In a dual wheel assembly, a pair of side by side dual wheels mounted for independent rotation, a pair of flat, annular brake members, one connected to each wheel, a pair of brake shoes between the brake members and hydraulic actuating means including a cylinder mounted on one brake shoe, and a piston connected to the other brake shoe for expanding the shoes one against the other.

4. In a dual wheel assembly, a pair of side by side dual wheels mounted for independent rotation, a pair of brake members of substantially uniform section so they may be balanced, one member being connected to each wheel for independent rotation, brake shoe means movable toward and from the members and engageable therewith for stopping the wheels and means for expanding the brake shoe means one against the other and into contact with both members so that equal braking pressure may be exerted on both drums.

5. In a dirigible dual wheel assembly for road vehicles the combination of a pair of side by side wheels rotatable about a common axis, a king pin having its axis so arranged to intersect the road at a point between the two wheels, and brake means connected to both wheels and lying in substantially the same plane as the king pin.

6. In a dirigible dual wheel assembly for road vehicles, the combination of a pair of side by side wheels rotatable about a common axis, a king pin having its axis so arranged as to intersect the road at a point between the two wheels, brake members, one attached to each wheel and positioned adjacent each other and cooperating braking means for engaging each of the brake members to retard both wheels.

7. In a dirigible dual wheel assembly for road vehicles, the combination of a pair of independently rotatable side by side wheels rotatable about a common axis, a spindle by which the wheels are rotatably mounted, a king pin on which the spindle and wheels are dirigibly pivoted, a pair of brake members, one connected to each wheel, brake means engageable with the members and brake actuating means in the general horizontal plane of the king pin and received within the space between the king pin and the brake members.

8. In a dirigible dual wheel assembly for road vehicles, the combination of a pair of independently rotatable side by side wheels rotatable about a common axis, a spindle by which the wheels are rotatably mounted, a king pin on which the spindle and wheels are dirigibly pivoted, a brake member connected to a wheel, braking means engageable with the member and brake actuating means positioned in the same general horizontal plane as the king pin and supported between the king pin and the brake member.

9. In a dirigible dual wheel assembly for road vehicles, the combination of a pair of independently rotatable side by side wheels rotatable about a common axis, a spindle by which the wheels are rotatably mounted, a king pin on which the spindle and wheels are dirigibly pivoted, a pair of brake members, one connected to each wheel, brake means engageable with the members and brake actuating means for engaging the brake means and members, the members and king pin lying in the same general plane.

10. In a dual wheeled assembly for road vehicles, the combination of a pair of side by side wheels, means for rotatably supporting the wheels for independent rotation about an axis, a brake member attached to each wheel, stationary brake means to engage the brake members and brake operating means in front of and to the rear of the axis and surrounded by the brake members.

11. In a dual wheeled assembly for road vehicles, the combination of a pair of side by side wheels, means for rotatably supporting the wheels for independent rotation about an axis, a brake member attached to each wheel, stationary brake means to engage the brake members and brake operating hydraulic motors on opposite sides of the axis and surrounded by the brake members.

12. In a dirigible, dual wheel assembly, a pair of side by side dual wheels mounted for independent rotation, a king pin, a spindle mounted for turning about the king pin, a brake member attached to one of the wheels, cooperating braking means movable toward and from the brake member and guide means for the braking means mounted in line with the king pin.

13. In a dirigible, dual wheel assembly, a pair of side by side dual wheels, mounted for independent rotation, a king pin, a spindle mounted for turning about the king pin, a brake member attached to one of the wheels, cooperating braking means movable toward and from the brake member, guide means for the braking means mounted in line with the king pin and brake actuating means located to one side of the king pin between the king pin and the brake members.

14. In a dirigible, dual wheel assembly, a pair of side by side dual wheels, mounted for independent rotation, a king pin, a spindle mounted for turning about the king pin, a brake member attached to one of the wheels, cooperating braking means vertically movable toward and from the brake member, and a pin and socket connection supporting the brake means and axially alined with the king pin to permit said vertical movement as well as movement of the brake means as the wheels are turned for steering.

15. In a dirigible, dual wheel assembly, a pair of side by side duel wheels, mounted for independent rotation, a king pin, a spindle mounted for turning about the king pin, a brake member attached to one of the wheels, cooperating braking means vertically movable toward and from the brake member, a pin and socket connection supporting the brake means and axially alined with the king pin to permit said vertical movement as well as movement of the brake means as the wheels are turned for steering, and brake actuating means located in front of and to the rear of the king pin and between the king pin and brake member.

16. In a dual wheel structure having independently rotatable dual wheels, means for rotatably mounting one wheel on the other in telescoping relation including thrust bearing means between the wheels, brake members attached to each wheel and located adjacent to each other and cooperating brake means engageable with the members and means for actuating the brake means to force the brake means into braking contact with the members.

17. In a dual wheel structure having independently rotatable dual wheels, means for rotatably mounting one wheel on the other in telescoping relation, a pair of brake members, expansible cooperating brake means engageable with the members to create friction by axially applied pressure, and thrust bearings between the wheels for resisting the axial thrust of the braking pressure.

18. In a dirigible dual wheel structure, an inner wheel having a hub with an inwardly projecting rim supporting portion, an outer wheel having a hub and substantially radially-extending rim-supporting portion, the inner wheel hub being telescoped with and inside the outer wheel hub, bearings between the inner and outer wheel hubs, a brake member attached to the outer wheel hub, a brake member attached to the inner wheel and spaced inwardly of the outer wheel brake member, cooperating brake means to frictionally engage the brake members, said inner wheel brake member having a portion extending radially inwardly to substantially cover the brake means.

19. In a dirigible dual wheel structure, an inner wheel having a hub with an inwardly projecting rim supporting portion, an outer wheel having a separate and removable substantially radially-extending rim-supporting portion, the inner wheel hub being telescoped with and inside the outer wheel hub, radial and thrust bearings between the inner and outer wheel hubs, a brake member attached to the inner wheel and spaced inwardly of the outer wheel brake member, cooperating brake means to frictionally engage the brake members, said inner wheel brake member having a portion extending radially inwardly to substantially cover the brake means.

CHARLES S. ASH.